(12) United States Patent
Riepshoff et al.

(10) Patent No.: US 8,655,705 B2
(45) Date of Patent: Feb. 18, 2014

(54) SYSTEMS, METHODS AND APPARATUS FOR IMPLEMENTING HYBRID META-HEURISTIC INVENTORY OPTIMIZATION BASED ON PRODUCTION SCHEDULE AND ASSET ROUTING

(75) Inventors: Robert D. Riepshoff, Troy, IL (US); Phillip Klinefelter, O'fallon, IL (US)

(73) Assignee: Lockheed Martin Corporation, Bethesda, MD (US)

( * ) Notice: Subject to any disclaimer, the term of this patent is extended or adjusted under 35 U.S.C. 154(b) by 691 days.

(21) Appl. No.: 12/686,537

(22) Filed: Jan. 13, 2010

(65) Prior Publication Data

US 2011/0173042 A1  Jul. 14, 2011

(51) Int. Cl.
*G06Q 10/00* (2012.01)

(52) U.S. Cl.
USPC ....... 705/7.26; 705/7.11; 705/7.12; 705/7.22; 705/7.25; 705/348

(58) Field of Classification Search
CPC . G06Q 10/06316; G06Q 10/06; G06Q 10/10; G06Q 10/0633; G06Q 10/0631
USPC ............. 705/7.26, 7.11, 7.12, 7.22, 7.25, 348
See application file for complete search history.

(56) References Cited

U.S. PATENT DOCUMENTS

| | | | |
|---|---|---|---|
| 5,369,570 A | | 11/1994 | Parad |
| 5,402,335 A | | 3/1995 | O'Brien |
| 5,943,484 A | * | 8/1999 | Milne et al. .................. 700/100 |
| 6,028,819 A | | 2/2000 | Mullankey et al. |
| 6,920,366 B1 | * | 7/2005 | Luh et al. ...................... 700/101 |
| 7,027,884 B2 | * | 4/2006 | Watanabe et al. ............... 700/97 |
| 7,376,600 B1 | * | 5/2008 | Wadawadigi et al. .......... 705/28 |
| 7,406,358 B2 | * | 7/2008 | Preiss ............................. 700/99 |
| 7,716,077 B1 | * | 5/2010 | Mikurak ...................... 705/7.12 |
| 2002/0169658 A1 | * | 11/2002 | Adler ............................. 705/10 |
| 2002/0198757 A1 | * | 12/2002 | Hegde et al. ...................... 705/8 |
| 2003/0014314 A1 | * | 1/2003 | Griep et al. ..................... 705/15 |
| 2003/0065415 A1 | * | 4/2003 | Hegde et al. .................. 700/100 |
| 2003/0149631 A1 | * | 8/2003 | Crampton et al. .............. 705/22 |
| 2003/0208392 A1 | * | 11/2003 | Shekar et al. ..................... 705/8 |

(Continued)

OTHER PUBLICATIONS

Alabas et al, A comparison of performance of artificial intelligence techniques for optimizing the number of kanbans, J of Op Res, 53, 907-914, 20022.*

(Continued)

*Primary Examiner* — Lynda Jasmin
*Assistant Examiner* — Octavian Rotaru
(74) *Attorney, Agent, or Firm* — Ronald E. Prass, Jr.; Prass LLP

(57) ABSTRACT

The disclosure relates generally to methods and apparatus to optimize a supply plan through a hybrid meta-heuristic approach based on genetic algorithms to optimize inventory and generate a supply plan. The apparatuses include a supply chain planner that interacts with the processes of a supply chain network. To provide a complete optimization for the type of platform being deployed in theater a heuristic algorithm is devised to decompose the supply plan problem into a production center schedule and an asset routing problem, which will be tackled one after the other. The decomposed supply plan problem is solved with different heuristic algorithms. Namely, genetic algorithms are used to optimize the supply plans based on ever changing set of operational demands from in theater and the priority of those demands to the assigned depots, while efficient constructive heuristics are used to deal with footprint and timing constraints.

3 Claims, 13 Drawing Sheets

(56) References Cited

U.S. PATENT DOCUMENTS

| | | | |
|---|---|---|---|
| 2004/0044557 A1* | 3/2004 | Frech et al. ........................ | 705/8 |
| 2004/0172344 A1* | 9/2004 | Stockwell et al. .............. | 705/28 |
| 2004/0220790 A1* | 11/2004 | Cullick et al. .................. | 703/10 |
| 2004/0225390 A1* | 11/2004 | Keller et al. ..................... | 700/95 |
| 2004/0249692 A1 | 12/2004 | Barrera | |
| 2005/0171827 A1* | 8/2005 | Denton et al. .................... | 705/8 |
| 2005/0197875 A1* | 9/2005 | Kauffman .......................... | 705/7 |
| 2005/0288983 A1 | 12/2005 | Biegler et al. | |
| 2006/0143063 A1* | 6/2006 | Braun et al. ....................... | 705/8 |
| 2007/0005411 A1* | 1/2007 | Preiss ............................... | 705/8 |
| 2007/0050225 A1* | 3/2007 | Leslie .............................. | 705/8 |
| 2007/0150329 A1* | 6/2007 | Brook et al. ....................... | 705/8 |
| 2007/0150332 A1* | 6/2007 | Grichnik et al. ................ | 705/10 |
| 2007/0150387 A1* | 6/2007 | Seubert et al. ................... | 705/31 |
| 2007/0239297 A1* | 10/2007 | Degbotse et al. .............. | 700/97 |
| 2008/0040190 A1* | 2/2008 | Khosla et al. ..................... | 705/9 |
| 2008/0071603 A1* | 3/2008 | Denton et al. .................. | 705/10 |
| 2008/0201183 A1* | 8/2008 | Jha et al. ............................ | 705/7 |
| 2008/0215414 A1 | 9/2008 | Fehnel et al. | |
| 2008/0218350 A1* | 9/2008 | Flores et al. ............... | 340/572.4 |
| 2008/0221953 A1 | 9/2008 | Iyer | |
| 2008/0243570 A1 | 10/2008 | Moorkanit et al. | |
| 2009/0105866 A1* | 4/2009 | Fontanot ....................... | 700/112 |
| 2009/0112645 A1* | 4/2009 | Jha et al. ........................... | 705/7 |

OTHER PUBLICATIONS

Asa Eric, An Intelligent 3D Open Pit Design and Optim using machine learning adaptive logic networks and neurogenetic algorithm, thesis, University Alberta, 2002.*
Balas et al, Linear Time Dynamic-Programming Algorithms for New Classes of Restricted TSPs—A computational Study, Informs Journal of Computing, p. 56, 2001.*
Baykoc et al, Simulation modellingand analysis of a JIT production system, Int J Production Economics, 55, 203-212, Elsevier, 1998.*
Ding Tao, Application of Stochastic models in scrap processing problem under JIT, thesis, Department of Mathematical and Statistical Sciences, Edmonton, 2002.*
Duplaga et al, Mixed-Model Assembly Line Sequencing at Hyundai Motor Company, Production and Inventory Management Journal, 37, 3, p20, ABI-INFORM, 1996.*
Eschenbach et al, Introduction to Air Resources, JIT, proceedings of the 2004 American Society for Engineering Education, 2004.*
Fang et al, A Rolling Horizon Job Shop rescheduling strategy in the dynamic environment, Int J Adv Manuf Technol, 13-227-232, Springer-Verlag, 1997.*
Flynn et al, The optimal review period in a dynamic inventory model, Operations Research, 45, 5, p. 736, ABI-Inform, 1997.*
Fripp et all, JIT Math for Engineers, ISBN 0750675357, Elsevier, 2003, selection.*
Huang et al, A simulation analysis of the japanese JIT technique with kanbans for a multiline, multistage production system.*
Jalali, Mohammad Reza, A study of application of JIT with stochastic pull rate and supply arrival time, Texas Tech University, 258 pages, AAT 9104810, 1990.*
Kurpad Mahesh Sriram, A comparative investigation of the Tabu search heuristic in sequencing mixed-model, Kanban-paced, JIT Final, U of Texas, 9521919, UMI 1994.*
Lee In-Soo, A Worst case Performance of the Shortest-processing-time Heuristic for Single Machine Scheduling, J Op Res Soc, n 10, pp. 895-901, 0160568291, 1991.*
Maier Holger R, A hybrid JIT project based learning approach to engineering education, proceeding of the 2008 AaeE Conference, Yeppoon, 2008.*
Miller et al, A Hybrid Genetic Algorithm for the Single Machine Scheduling Problem, Journal of Heuristics, ABINFORM Global 5-4, p. 437, Dec. 1999.*
Mitwasi, Mousa George, Mathematical models for the deterministic, capacitates, single kanban system, dissertation, 9136854, University of Arizona 1991.*
Naso et al, Genetic algorithms for supply-chain scheduling—A case study in the distribution of ready-mixed concrete, Elsevier 03772217, 2005.*
Potts et al, Single Machine Scheduling to minimize total late work, Operations Research, v40, n3, 0030364x9240030586, 1992.*
Roach et al, A Hybrid GA-SA Algorithm for Just-In-Time scheduling of multi-level assemblies, Computers ind Eng, N4, pp. 1047-1060, Elsevier S0360835296, 1996.*
Sparling David, Balancing JIT production units, the N U-line balancing problem, 36, 4, INFOR, p. 215, ABI-INFORM, 1998.*
Tayur Sridhar, Structural Properties and Heuristic for Kanban controlled Serial Lines, Management Science, 39, 11, p. 1347, ABI-INFORM, 1993.*
van der Aalst, Inheritance of Business Processes—A Journey visiting four notorious problems, CiteSeer, 2003.*
Vembu et al, Heuristics for Operator Allocation and Sequencing in JIT Flow Line Manufacturing Cell, Comp ind Eng, v 29 n1-4 p. 309-313 Elsevier, 0360835295, 1995.*
Wang Dingwei, Earliness-Tardiness production planning approaches for manufacturing systems, Com ind Eng, v28, n3, pp. 425-436, Elsevier 0360835295, 1995.*
Wang et al, JIT production planning approach with fuzzy due date for OKP manufacturing systems, Int J Production Economics 58, 209-215, Elsevier, 0925527399, 1999.*
Urmila Diwekar, Introduction to Applied Optimization, ISBN 978-0-387-76634-8, Springer 2008.*
Mansouri, A multi-objective genetic algorithm for mixed-model sequencing on JIT assembly lines, Elsevier, 03772217, 2004.*
Non-Final Office Action dated Dec. 30, 2011; Issued in related U.S. Appl. No. 12/686,524, filed Jan. 13, 2010.

* cited by examiner

SYSTEMS, METHODS AND APPARATUS FOR IMPLEMENTING HYBRID META-HEURISTIC INVENTORY OPTIMIZATION BASED ON PRODUCTION SCHEDULE AND ASSET ROUTING

RELATED APPLICATION

This application is related to U.S. patent application Ser. No. 12/686,524, filed Jan. 13, 2010, and published as U.S. Patent Application Publication No. 2011/0173034 on Jul. 14, 2011, entitled "SYSTEMS, METHODS AND APPARATUS FOR SUPPLY PLAN GENERATION AND OPTIMIZATION". The disclosure of the related application is hereby incorporated by reference herein in its entirety.

FIELD OF THE INVENTION

This invention relates generally to optimizing resources in a supply chain network, and more particularly to optimization of supply plan problems.

BACKGROUND OF THE INVENTION

A supply plan describes items to be procured and operations to be performed by processes within a supply chain network in order to deliver materials or items to an entity, such as, for example, a customer within the supply chain network. A supply plan is essential for the scheduling of mission-critical operations within constrained environments such as military and/or scientific research bases, ships, oil rigs, and factory floors. To facilitate interaction with suppliers and requesters an item request handling system accepts requests for an item and an allocation in accordance with the supplier's supply plan is undertaken. Various constraints may be placed on the supply chain network, such as, for example, limitations on the availability of materials or items from one of the process within the supply chain network. Yet another limitation is to prohibit the entity from changing the initial order so as to preserve the integrity of the supply plan. Such limitations are necessary because current inventory optimization and supply plan generation for deliberate and crisis action plans during peace/war time are cumbersome, inaccurate and slow to create.

Current optimization schemes take different and limited approaches to solve the myriad of supply plan problems. One optimization scheme identifies a set of delivery routes for a set of deliveries from specified locations. Another scheme collapses or shrinks the supply chain network so as to derive a single global formula to handle scheduling and routing optimization. These optimization schemes essentially optimize to a smaller less complex set of input requirements. Additionally, such systems are often constrained by an inability to account for different possibilities like a change in order or a change in operational availability. Further, current inventory optimization and supply plan generation for deliberate and crisis action plans during peace and/or wartime are cumbersome, inaccurate, and slow to create. In parallel to this missions are being executed, and a certain level of operational availability is expected to be maintained against the platforms to support and maintain a force/mission readiness.

For the reasons stated above, and for other reasons stated below which will become apparent to those skilled in the art upon reading and understanding the present specification, there is a need in the art for an evolutionary approach to supply chain planning and routing. There is also a need for an improved supply plan that is optimized to a complex set of input requirements.

BRIEF DESCRIPTION OF THE INVENTION

The above-mentioned shortcomings, disadvantages and problems are addressed herein, which will be understood by reading and studying the following specification.

The disclosure relates generally to methods and apparatus to optimize a supply plan through a hybrid meta-heuristic approach based on genetic algorithms to optimize inventory and generate a supply plan. The apparatuses include a supply chain planner that interacts with the processes of a supply chain network. To provide a complete optimization for the type of platform being deployed in theater a heuristic algorithm is devised to decompose the supply plan problem into a production center schedule and an asset routing problem, which will be tackled one after the other. The decomposed supply plan problem is solved with different heuristic algorithms. Namely, genetic algorithms are used to optimize the supply plans based on ever changing set of operational demands from in theater and the priority of those demands to the assigned depots, while efficient constructive heuristics are used to deal with footprint and timing constraints.

Aspects of the disclosed embodiments relate to a computer-accessible medium having executable instructions to optimize inventory and to generate a supply plan for managing the routing of at least one item through a supply chain network having a number of geographically distributed storage and production centers, the executable instructions capable of directing a processor to accumulate performance data relating to a plurality of processes associated with the supply chain network; receive operational demands for the routing of the at least one item through the supply chain network, wherein each received operational demand includes a priority level; model a supply planning problem for the supply chain network based on the received operational demands; decompose the supply planning problem into a production center schedule problem and an asset routing problem; optimize the decomposed supply planning problem through heuristic processing; and generate a supply plan that incorporates the optimized decomposed supply planning problem.

In another aspect the computer-accessible medium includes heuristic processing consisting of genetic algorithm processing, constructive heuristic processing, and heuristic stochastic processing.

In still another aspect, the computer-accessible medium optimizes the supply plan by maximizing operational availability and minimizing logistic footprint maximization of mission success, and minimization of cost.

In further aspects, a method to optimize inventory and to generate a supply plan for managing the flow of at least one item through a supply chain network having a number of geographically distributed storage and production centers by performing the steps of accumulating performance data relating to a plurality of processes associated with the supply chain network; receiving operational demands for the flow of the at least one item through the supply chain network, wherein each received operational demand includes a priority level; modeling a supply planning problem for the supply chain network based on the received operational demands; decomposing the supply planning problem into a production center schedule problem and an asset routing problem; optimizing the decomposed supply planning problem through heuristic processing; and generating a supply plan that incorporates the optimized decomposed supply planning problem.

In another aspect, an apparatus to optimize a supply plan for managing the flow of one or more items through a supply chain network having a number of geographically distributed storage and production centers. The apparatus comprises a memory to store supply plan optimizing instructions; and a processor to execute the supply plan optimizing instructions to cause the generation of an optimized supply plan by accumulating performance data relating to a plurality of processes associated with the supply chain network; receiving operational demands for the flow of the at least one item through the supply chain network, wherein each received operational demand includes a priority level; modeling a supply planning problem for the supply chain network based on the received operational demands; decomposing the supply planning problem into a production center schedule problem and an asset routing problem; optimizing the decomposed supply planning problem through heuristic processing; and generating a supply plan that incorporates the optimized decomposed supply planning problem.

Systems, clients, servers, methods, and computer-readable media of varying scope are described herein. As disclosed herein a computer-readable media for carrying or having computer-executable instructions or data structures stored thereon for operating such devices as controllers, sensors, collection of data, collection of information, and eletromechanical devices. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Operational availability is specified as of the at least one of the following items for an operating time at a geographic location to facilitate mission tasks including manufacturing, maintenance, repair, or overhaul activity: one or more workers, a facility, production of an asset, infrastructure, test equipment, a tool, one or more assets, and a resource. Operational reliability is specified as a percentage of mission success objectives met. Because the specific mission objectives vary depending on the type of system, a measurement objective for mission success might be a tour, launch, deployment, or other system-specific objective. Cost per unit usage is the total operating cost divided by the appropriate unit of measurement for a given system. For example, the unit might be miles driven, flight hours flown, hours of service, or some other system-specific unit.

Logistics footprint is a measure of the size of the support personnel, equipment and facilities required to maintain the system. Logistics response time is a measure of how long it takes to deliver parts, systems, and labor to support the system. For any given supply plan, these performance based logistics metrics will be specified in a way that makes sense for the specific mission, and performance requirements will be built into the supply plan or to acquisition contract when services and assets are assigned to third parties. The resulting analysis and action planning provides a basis for prescribing a supply plan and series of decisions that will maximize system performance, business benefit such as minimization of cost, or mission success with the highest probability.

Figure 1:
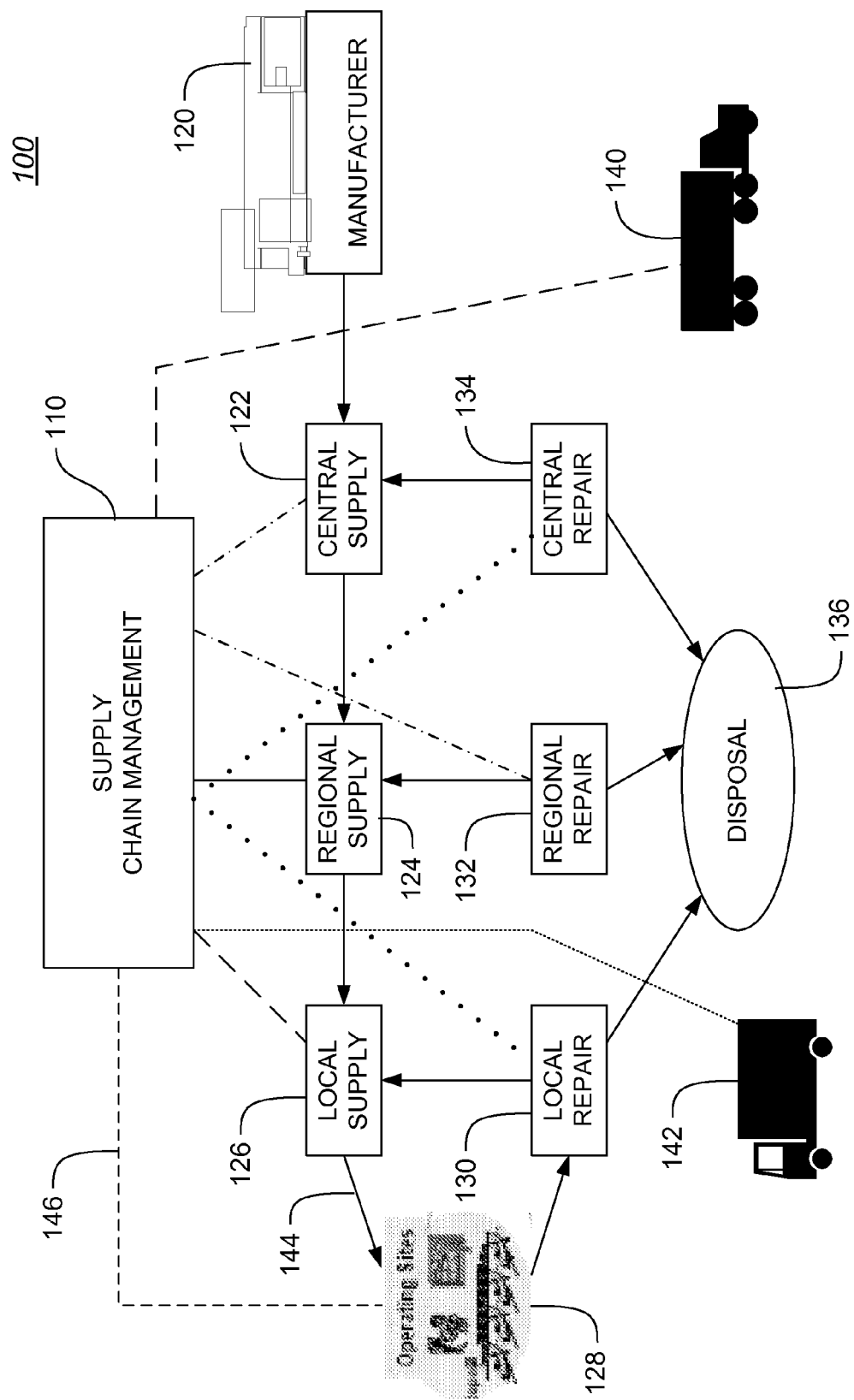
FIG. 1 illustrates a supply chain network in accordance to an embodiment.

FIG. 1 illustrates a supply chain network (SCN) 100 in accordance to an embodiment. In particular, SCN 100 is a Supportability Enterprise Model (SEM) that models both the depth and breadth of an enterprise system. The depth includes all levels or echelons of support function from operational unit level down to original equipment manufacturer. The breadth includes all locations worldwide where support functions may be performed. Additionally, the Supportability Enterprise Model tracks the movement of materials among the various locations. It includes business rules to model centralized management by an autonomic logistics (AL) process that senses and responds automatically to changes. In particular, the supply chain network 100 comprises a supply chain management system 110, local supply 126, regional supply 124, and central supply 122 for receiving items from original equipment manufacturers (OEMs) such as manufacturer 120, local repair 130, regional repair 132, central repair 134, disposal 136, various logistical modes 140, 142, operation sites 128. All these nodes on the supply chain network 100 are in communication with the supply chain management system 110. The rectangle labeled "supply" (122-126) and "repair" (130-134) each represent storage of a material at a specific location that is either being repaired or ready to be passed to the next supply or repair depot. The arrows such 144 each represent material relationships that may be required for various material transformations performed in the supply chain network 100. As example arrow 144 shows the transfer of material between local supply 126 and operating site 128. In addition, the operating site can transfer material to the local repair when equipment is in need of services.

Figure 2:
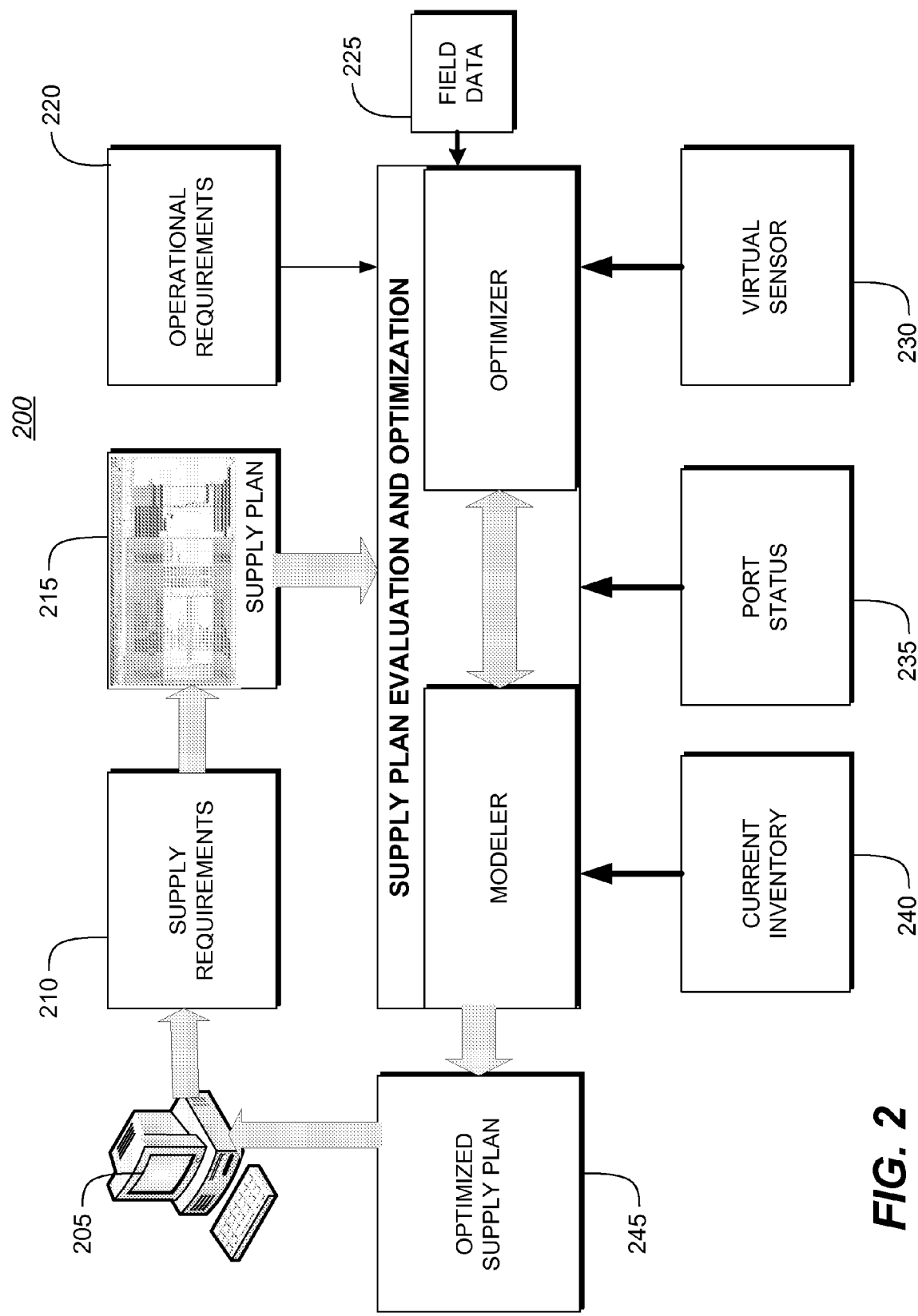
FIG. 2 is a block diagram of a supply plan optimization system in accordance to an embodiment.

FIG. 2 is a block diagram of a supply plan optimization system 200 in accordance to an embodiment. Supply plan optimization system 200 comprises supply chain planner 215, one or more supply chain process like those shown in FIG. 1, computers 205, a network and communication links (not shown). Although a single supply chain planner 215, one or more supply chain entities, and a single computer 205 are shown and described. It is contemplated that any number of supply chain planners 215, any number of supply chain entities, any number of computers 205, or any number of networks can be employed according to particular needs. In a preferred embodiment, supply chain network 100 may describe the flow of items, such as, for example, materials and products through one or more supply chain entities or other supply chain planning environments associated with supply chain network 100. As described below, supply plan optimization system 200 may be used to determine an optimized supply chain plan that manages items to be procured and operations to be performed in order to deliver material or products to one or more supply chain entities in a particular planning horizon. The SEM model provides integrated modeling of a worldwide support system including operations, supply, repair, and transportation functions. It allows for modeling of dynamic changes throughout life-cycle to include fleet build up and retirement, site activation or closure, allocation or reallocation of spares, equipment and human assets, and deployment or surge of operational units. The supply plan optimization system 200 accumulates performance data from such from processes that can measure the current inventory 240, processes that can measure port status 235, processes that can aggregate data from a myriad of sources into a virtual sensor 230, and processes that can measure field data 225 from personal deployed at the operating sites 128 or from machinery or equipment that provide logistical operations and or are the material that is being moved through the supply chain network 100. The measure field data 225 is identification information and attributes, from a plurality of entities using radio frequency identification (RFID) and transactions history for said plurality of entities from one or more databases. Additionally, other data such operational requirements 220, supply requirements 210, or prognostics and health management data. The supply plan optimization system 200 takes the performance data, the requirements, and operational demands to formulate an optimized supply plan 245 that can then be implemented by all the users of the supply chain network 200.

The accumulated data, accumulated requirements, accumulated operational demands are processed by a supply plan evaluation and optimization 250 processor having a model 255 and an optimizer 260. The supply plan evaluation and optimization 250 processor may consider various constraints associated with one or more supply chain entities when determining an optimized supply plan, such as, for example, limitations on the availability of materials from one or more supply chain entities, the capacity of one or more supply chain entities, and the like. As described below in FIG. 8, these various constraints may prevent one or more supply chain entities from satisfying supply chain demand, and may delay supply chain demand from being satisfied during a particular planning horizon. The supply plan evaluation and optimization 250 processor may evaluate and select various optimal solutions based on the objectives of one or more supply chain entities. These objectives may include, but are not limited to, maximizing demand satisfaction, minimizing inventory, maximization of mission success, and minimization of cost, maximizing use of preferred alternatives, maximization of operational availability, minimization of logistic footprint, production center schedule problem, and an asset routing problem. The generated optimized supply plan represents a set of operations to be performed across a particular planning horizon. Although, supply chain network 100 is shown and described as associated with one or more supply chain entities, supply chain network 100 may provide an optimized supply chain plan to any number of supply chain entities, according to particular needs.

Figure 13:
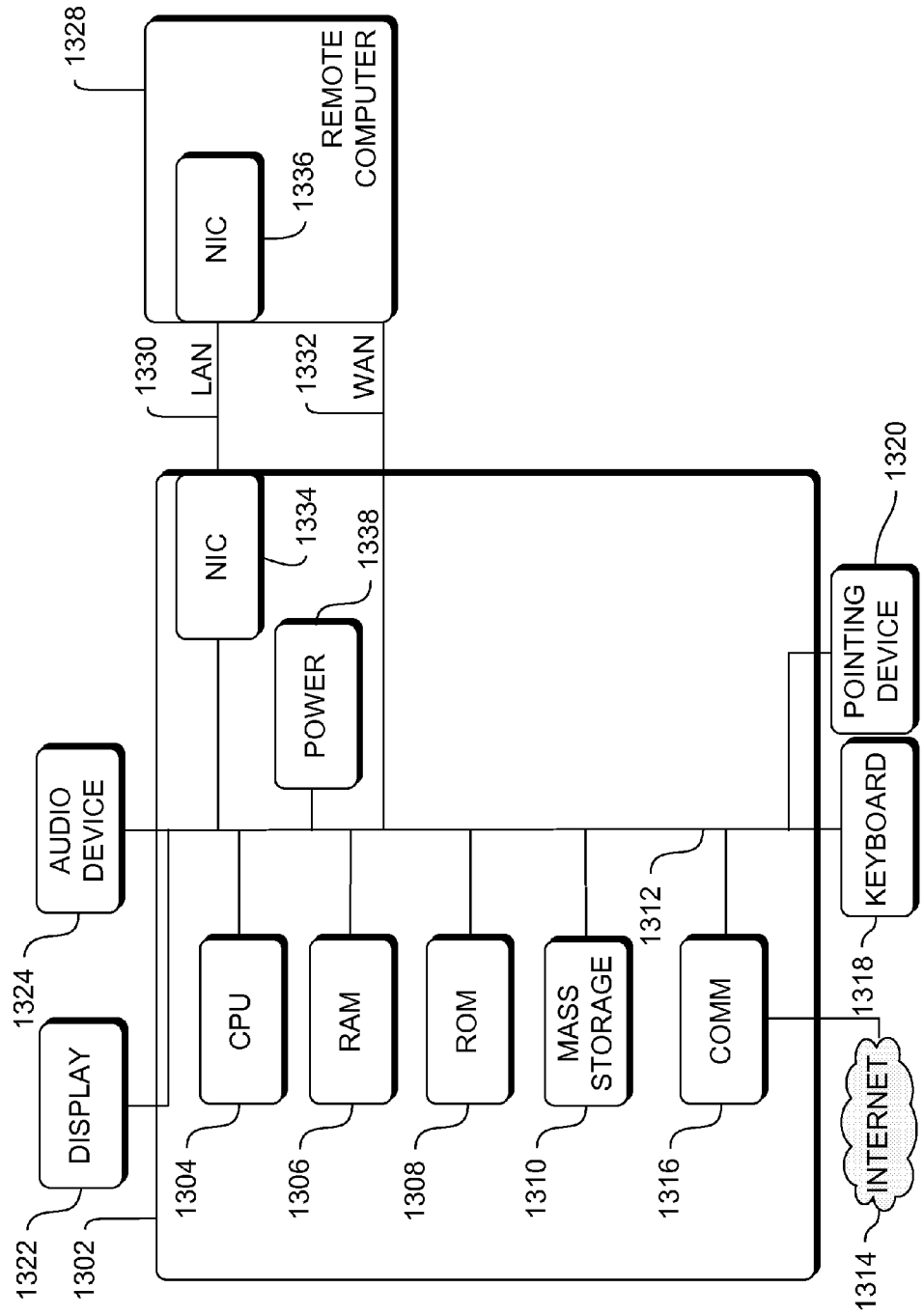

The supply plan evaluation and optimization 250 processor may operate on one or more computer that are integral to or separate from the hardware and/or software that support supply chain planner 215 and one or more supply chain entities like shown in FIG. 13. Computers 205 may include any suitable input device such as a keypad, mouse, touch screen, microphone, or other device to input information. An output device may convey information associated with the operation of supply chain network 100, including digital or analog data, visual information, or audio information. Computers 205 may include fixed or removable storage media, such as magnetic computer disks, CD-ROM, or other suitable media to receive output from and provide input to Supply plan optimization system 200. Computers 205 may include one or more processors and associated memory to execute instructions and manipulate information according to the operation of Supply plan optimization system 200.

Figure 3:
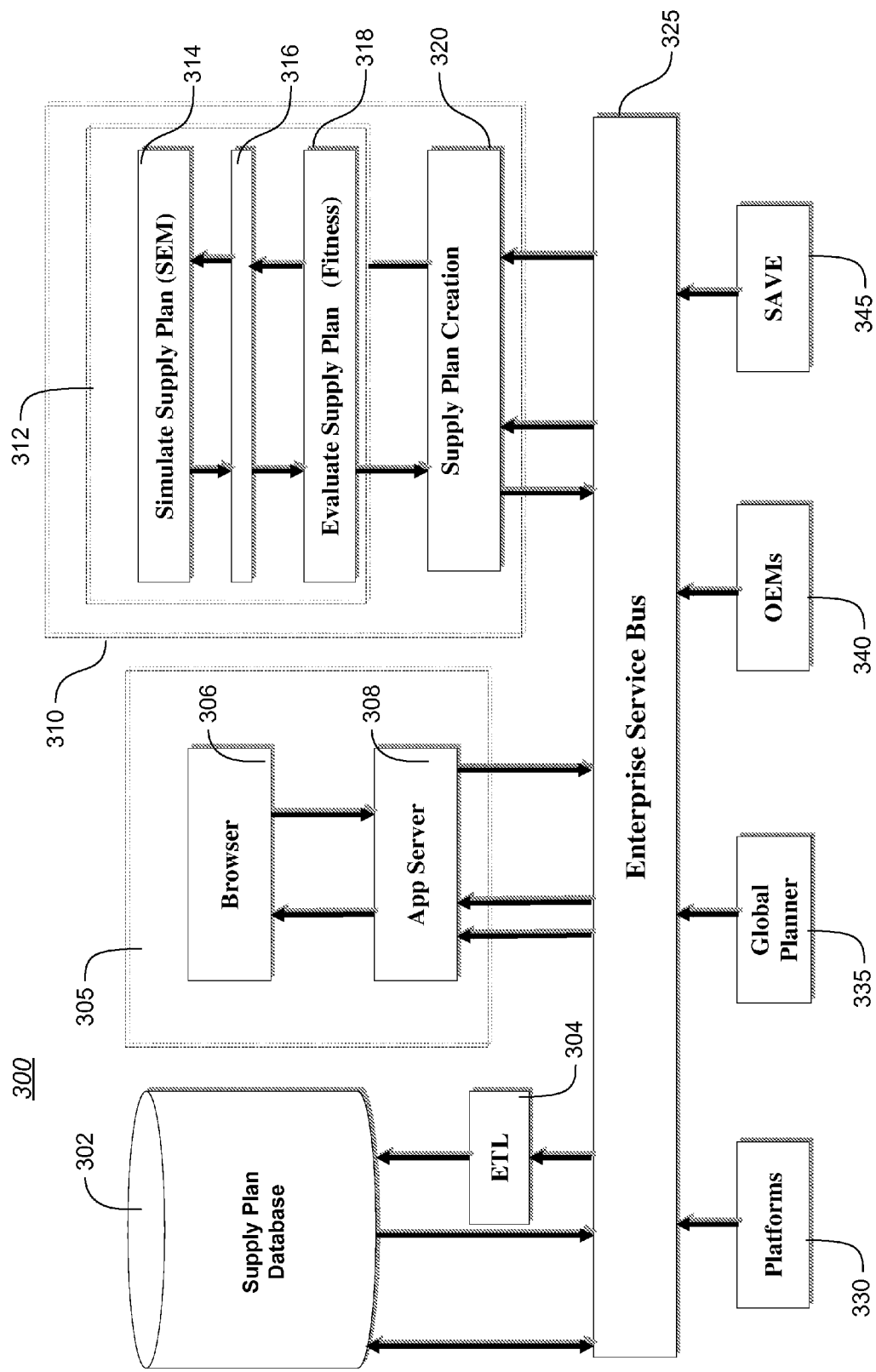
FIG. 3 is a block diagram of the supply plan evaluation and optimization system of FIG. 2 in accordance to an embodiment.

FIG. 3 is a block diagram of the supply plan evaluation and optimization 250 system of FIG. 2 in accordance to an embodiment. As discussed above, supply plan evaluation and optimization 250 system stores supply chain data and various constraints associated with one or more entities, in a supply plan database 302. In addition, as discussed above, supply plan evaluation and optimization 250 processor comprises one or more computers at one or more locations including associated input devices, output devices, mass storage media, processors, memory, or other components for receiving, processing, storing, and communicating information according to the operation of supply chain network 100. The enterprise service bus (ESB) 325 is based on a service-oriented architecture (SOA) that allows software units or components and their functions to flexibly coordinate, depending on a structural unit of a business process. A system can be configured so that data is exchanged among work systems such as manufacturing facilities and depots through the ESB using XML message.

Platforms 330 provide a prognostics and a diagnostics of assets and equipment in the supply chain network. Global planner 338 is a gateway for submitting mission requirement information that can be incorporated in formulating a supply plan. OEM 340 is a vehicle for submitting inventory and capacity information. Observation is a gateway for providing port or depot status information. The information is sent to supply plan database 302 for retrieval in the future.

A web human machine interface (HMI) accepts a user generated supply plan. A data source points (330 . . . 345) collects information about processes that are operating at different nodes of the supply chain network 100. An enterprise service bus 325 handles the communication between the supply plan database 302, web HMI 305, data source points, and a supply plan optimizer 310.

Web HMI 305 provides a vehicle for a user to receive and create a supply plan through a browser 306. The user through browser 306 can request optimization of the supply plan, and receive data alerts and an optimized supply plan. Using a client system a user uploads at least one HMI file via a local area network (1330 shown in FIG. 13) or internet connection 1314 (shown in FIG. 13) from an application server 308. The at least one HMI file includes at least one of an HMI screen and an HMI object. When a user selects to download an uploaded HMI file, the user can view details about the uploaded HMI file such as a brief description, author information, a category regarding, and a creation date of the uploaded HMI file. Once a file is downloaded, the browser 306 prompts the user to save the downloaded HMI file to the supply plan database 302 or otherwise. The browser 305 and application server 308 use a messaging scheme such as Cometd or Bayeux to exchange necessary data. Cometd is a message bus for Ajax web applications that allows multi channel messaging between client and server. Cometd supports responsive two-way interactions between web clients such as browser 306 using Ajax and the web server. As a protocol Cometd transports asynchronous messages (primarily over HTTP), with low latency between a web server and a web browser. The asynchronous messages are routed via named channels and can be delivered server to client, client to server and client to client (via the server). By default, publish subscribe routing semantics are applied to the channels, but other routing models are also supported.

The supply plan optimizer 310 comprises supply plan creation 320 module and distributed processing 312 module. The supply plan creation 320 module creates a candidate supply plan that models the supply planning problem for the supply chain network based on one or more accumulated performance data, received requirement, and operation demand. The model has inputs and outputs having properties such as definiteness, finiteness, and resource constrained. The performance data, the received requirements, and operational demands may be normalized to increase the cohesion of entity types between data attributes within the model. The supply plan creation 320 module is also programmed to receive an optimization control request to begin the processing of the supply plan. The optimization control request may include supply requirements, operational demands, or other information necessary to generate candidate supply. When the supply plan is optimized, the supply plan creation 320 module forwards the supply plan to the web HMI 305 or to the supply plan database 302.

The candidate supply plan generated by the supply plan creation 320 module is then subjected to fitness module 318. The fitness module 318 determines the effectiveness of a selected set of variables and a selected set of methods for processing those variables in determining an optimized supply plan. A population of candidates is assembled and tested against a fitness function. Then the population of possible solutions (chromosomes) is generated. A function assigns a degree of fitness to each chromosome in every generation in order to use the best individual during the evolutionary process. In accordance to the objective, the fitness function evaluates the individuals. Each chromosome is evaluated using a fitness function and a fitness value is assigned. Then, three different operators (selection, crossover, and mutation) are applied to update the population. A generation refers to an iteration of these three operators. The selection operation is the initial genetic operation that is responsible for the selection of the fittest chromosome for further genetic operations. This is done by offering ranks based on the calculated fitness to each of the prevailing chromosome. On the basis of this ranking, best chromosomes are selected for further proceedings. The crossover operation selects a number (N) of chromosomes for crossover. In effect, the crossover operation decomposes the supply planning problem for the supply chain network into separate sub-problems that can be solved separately. In a two chromosome crossover, as soon as the crossover operation is completed the genes of the two chromosomes present within the two crossover points get interchanged. The genes before the crossover point of the first chromosome and the genes beyond the crossover point of the second chromosome remain unaltered even after the crossover operation. The crossover operation is succeeded by the final stage of genetic operation known as Mutation. In the mutation, a new chromosome is obtained. This chromosome is totally new from the parent chromosome. In this way, the fitness module 318 is able to adapt or evolve with the dynamic changes in a supply chain network.

The product of the fitness module 318 is forwarded to a simulator data abstraction layer 316 to have the candidate supply plan simulated by simulator 314. Simulator 314 performs a feasibility and impact analysis on the proposed changes to the supply chain network based on the candidate supply plan. Simulator 314 is used to generate flow data corresponding to movements of one or more physical objects through supply chain network 100. More particularly, the flow data generally corresponds to known, expected, or potential movements of physical objects through a particular environment such as depots, OEM facilities, operating sites, ports, and distribution hubs. Simulator 314 can test the effect of a candidate supply plan on certain business policies like operational availability, logistic footprint, inventory levels, production center capacity, price-protection policies, and benefits or penalties contingent upon the compliance of the decision-making entities. The simulation and the fitness evaluation are repeated until an optimized supply plan is developed for the particular supply chain network. The generated optimized supply plan is forwarded to the web HMI 305 for a user to review and to supply plan database 302.

Supply plan database 302 comprises one or more databases or other data storage arrangements at one or more locations, local to, or remote from, server. Supply plan database 302 stores data associated with one or more entities of supply chain network 100, supply plan, and optimized supply plan. Supply plan data is passed through ETL 304 module so that the data is extracted, transformed, and loaded to the targeted database. Optimized supply plan can be directly stored by supply plan optimizer 310 and retrieved by all users.

Examples of supply data in a mission critical supply chain network consist of: Site types that include squadrons, bases, repair facilities, supply warehouses, and factories. Site data provides the location, capability and availability of each site; Connection data defines the support network established by linking the defined sites into repair and supply chains. Each site has a list of sites that provides/receives serviceable parts to/from (supply chain) and a list of sites that it provides/receives unserviceable parts to/from (repair chain); Configuration data details the air vehicles in terms of parts, squadron assignments, and maintenance requirements; Part data or item data provides cost, dimensions, weight, R&M characteristics, and spare availability at each base, supply, repair, and original equipment manufacturer (OEM) site; Task types include supply, repair, maintenance, and build; Task data details the duration, resource requirements and cost factors for each task; Resource types are personnel and support equipment (SE); Personnel data provides the cost and number available at each site by skill; Costs for personnel can be accumulated annually (employee) or by usage hours (contractor); Equipment data provides costs, maintenance requirements and available quantity at each site; Cost elements for equipment include acquisition, event (repair or calibration) and consumption (fuel, oil, and the like); Flight schedule data provides launch time, duration and mission parameters for flight operations at squadron sites; Schedules are defined in a repetitive pattern (daily, weekly, monthly, or the like); Transport data provides delivery standards and options for transport of parts from site to site; Delivery standards provide a target by priority, cargo type and from/to transport zone; Transport options provides information on available modes including weight/volume limits, average delivery time, standard deviation for delivery time and cost by cargo type and transport zone; Priorities, cargo types and transport zones are user definable; Deployment data details the movement of squadrons from their customary base to a temporary base including spares, personnel, and equipment needed to support flight operations at that site; Cumulative cost is recorded by category (spare, support equipment, transport, storage, tasks consumables, SE maintenance, SE consumables, and labor) for each summary/detail period; The number of parts manufactured at any OEM site during each summary/detail period is recorded; The number of parts repaired at a site during each summary/detail period is recorded; Statistics are recorded for parts (repairs, issues, requisitions, backorders, retrogrades, condemnations.) and by aircraft (sorties, flight hours, possessed hours, downtime, maintenance) during each summary/detail period; At each site and for each part, the count of transport events by transport mode and priority is recorded for each summary/detail period; At each site and for each part, the count of inventory level by is recorded for each summary/detail period; At each site and for each part, the count of production center capacity recorded for each summary/detail period.

The system level overview of the operation of an embodiment is described above in this section of the detailed description. Some embodiments operate in a multi-processing, multi-threaded operating environment on a computer, such as computer 1302 in FIG. 13.

Figure 4:
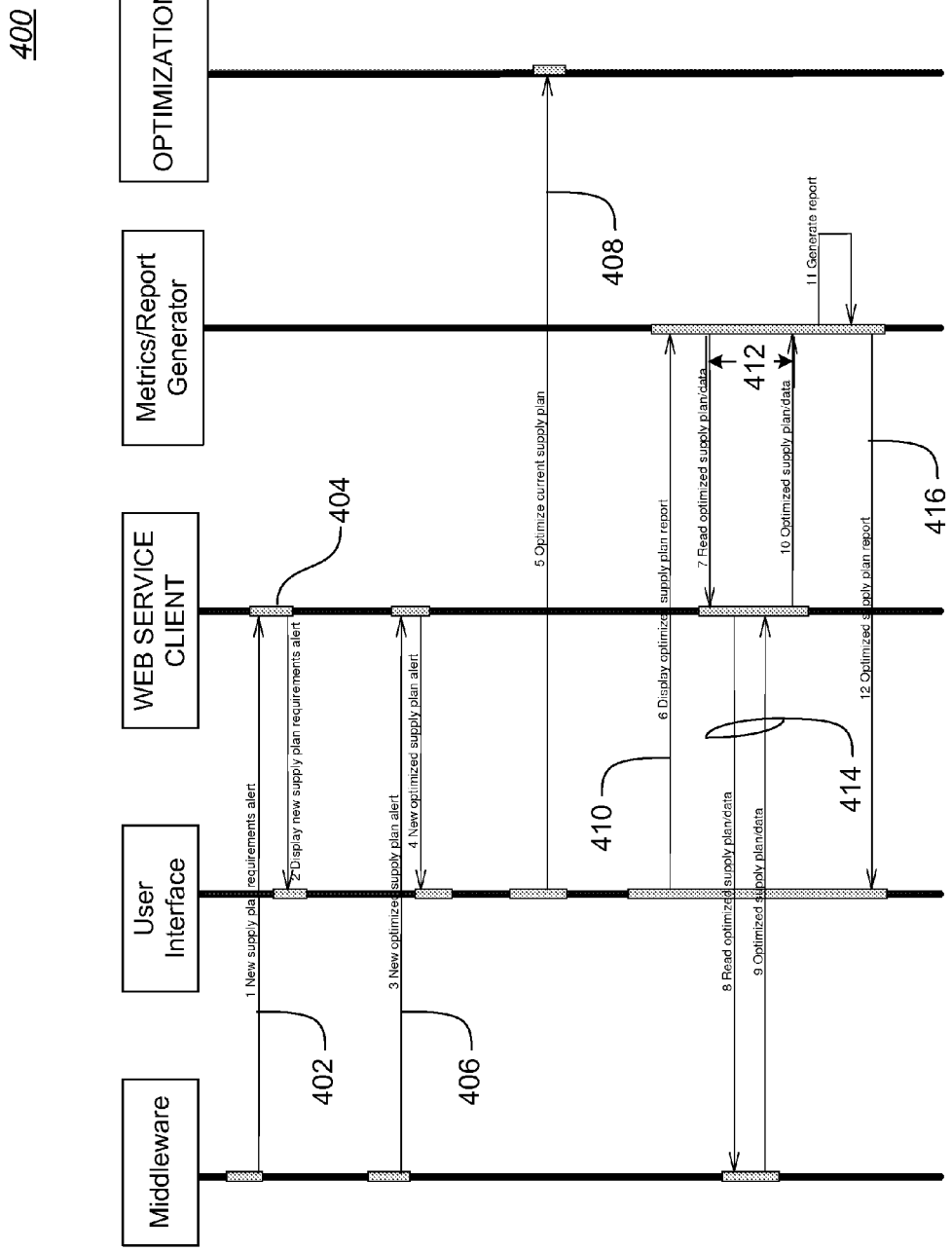
FIG. 4 is an illustration of a supply plan human machine interface sequence in accordance to an embodiment.

FIG. 4 is an illustration of a supply plan human machine interface (HMI) sequence 400 in accordance to an embodiment. The middleware 420 broadcasts 402 a new supply plan requirements alert. The web service client 424 causes the user interface 422 to display 404 the new supply plan requirements alert. It is also envisioned that the middleware 420 through the web service client 424 would provide the user interface with an optimized supply plan alert 406. The user interface 422 can request 408 that the optimizer 428 optimizes the current supply plan. The user interface can also request 410 that a metrics/report generator displays an optimized supply plan report 410. The metrics/report generator 426 would then request from the web service client 424 supply plan data that can be used to generate the report 412. The web service client can receive optimized supply plan data 414 for the purpose of generating the report. The generated report is then forwarded 416 to the user interface 422 for further processing.

Figure 5:
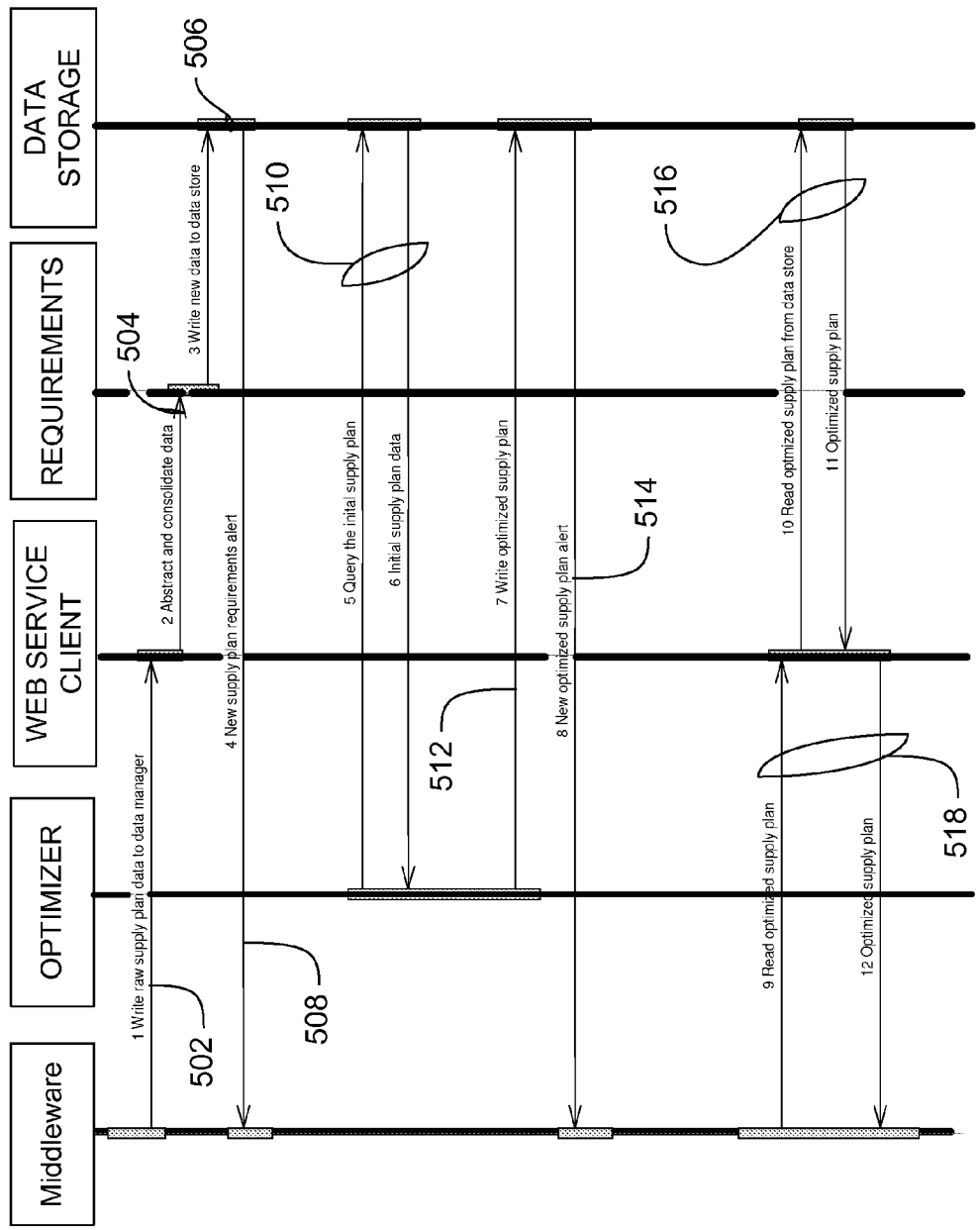
FIG. 5 is an illustration of a supply plan data manager sequence in accordance to an embodiment.

FIG. 5 is an illustration of a supply plan data manager sequence 500 in accordance to an embodiment. The supply plan data manager sequence 500 illustrates three type of interactions with the data storage 522. The first sequence entails the writing of a supply plan data 530. The second sequence is the interaction between the optimizer 428 and the data storage 535. The third sequence is the reading of the supply plan data from data storage 522.

In the first sequence 530 a request to write raw supply data to data manager 502 is sent to the web service client 424 by the middleware 420. The web service client 424 then abstracts and consolidates the received supply data 504. Requirements 520 module then writes the new data to data storage 522. The data storage 522 then sends the middleware 420 a new supply plan requirements alert 508.

In the second sequence 535 the optimizer 428 queries the data storage 522 about the initial supply plan 510. The data storage responds to the query by forwarding the initial supply plan data. The optimizer 428 writes optimized supply plan 512 to the data storage 522. The data storage 522 broadcasts a new optimized supply plan alert to middleware 420.

In the third sequence 540 a request to read the optimized plan 518 is sent to the web service client 518. The web service client 424 sends the request to the data storage 522 which then retrieves the supply plan 516.

Figure 6:
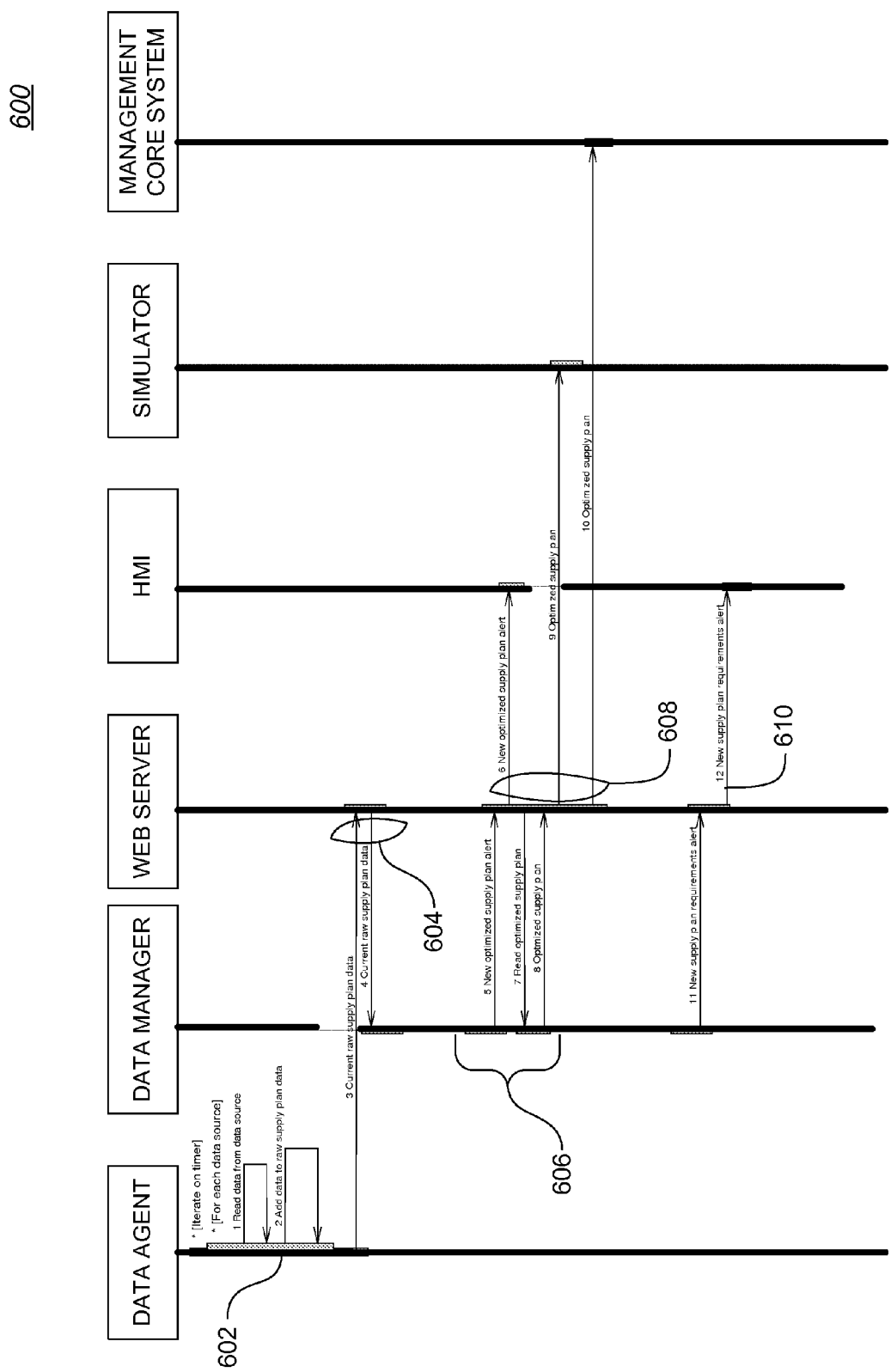
FIG. 6 is an illustration of a middleware sequence in accordance to an embodiment.

FIG. 6 is an illustration of a middleware sequence 600 in accordance to an embodiment. Data agent 620 periodically collects raw supply plan data 602 from different data sources like operating sites 128 and OEMs. The raw supply data is then forwarded to web service client 424 so as to be written 604 in data storage 522. Data storage 522 sends an alert that a new optimized supply plan is available for reading 606. The Web service client 424 sends the new optimized supply plan alert 608 to the user interface 422, simulator 622, and the management core system 624. The data storage 522 sends a new supply plan requirements alert 610 to the user interface.

Figure 7:
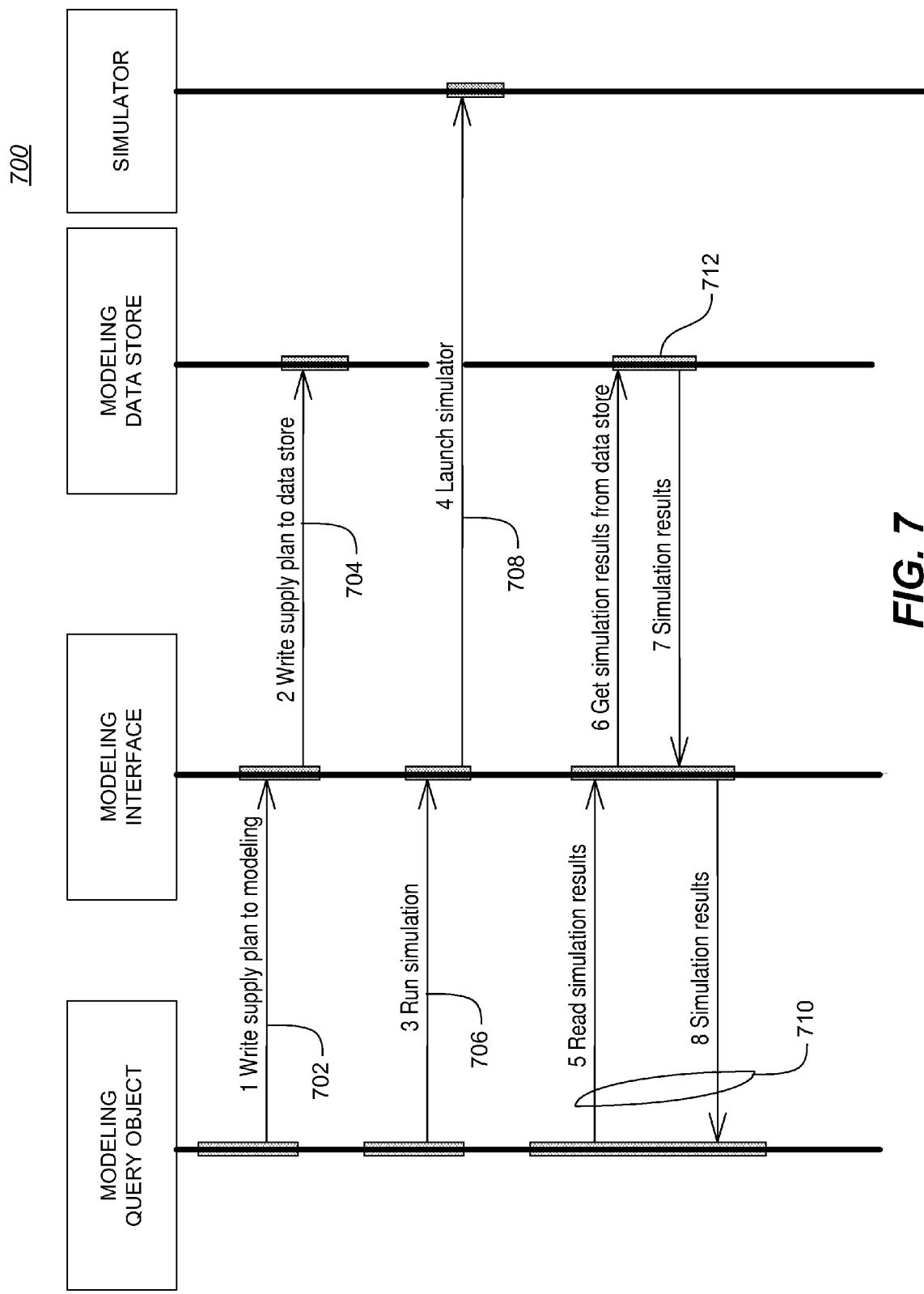
FIG. 7 is an illustration of a supply plan modeling sequence in accordance to an embodiment.

FIG. 7 is an illustration of a supply plan modeling sequence 700 in accordance to an embodiment. The modeling object 720 uses the modeling interface 722 to write supply plan 702, request a simulation 706, read simulation results 710. The modeling interface 722 can write supply plan 704 and request simulation results 712 from data storage 522. The modeling interface 708 can launch the simulator 708.

Figure 8:
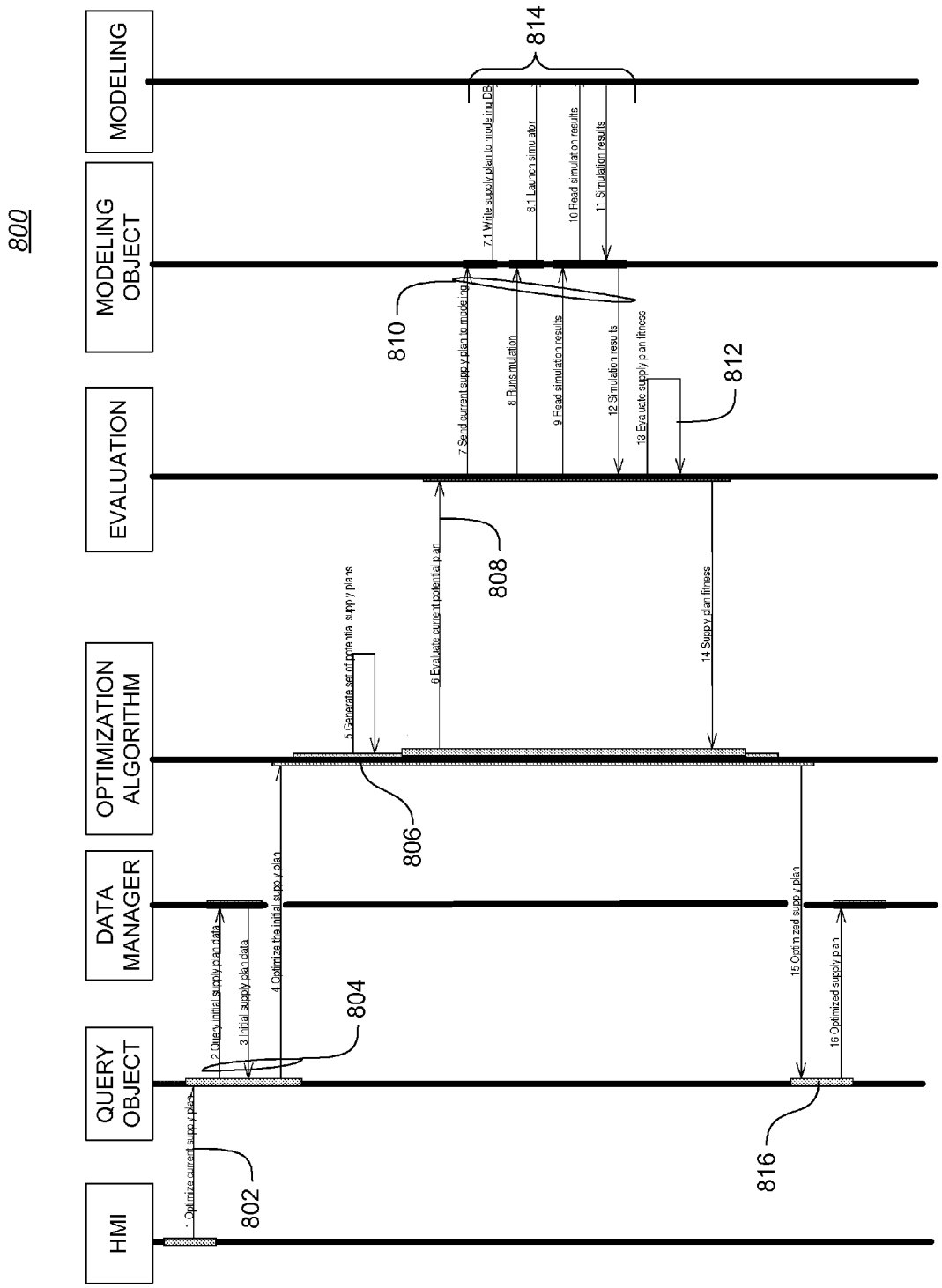
FIG. 8 is an illustration of a supply plan optimization sequence in accordance to an embodiment.

FIG. 8 is an illustration of a supply plan optimization sequence 800 in accordance to an embodiment. The user interface 422 sends requests that the current supply plan be optimized 802. The query object 804 queries the data manager 804 for the initial supply plan so that query object can include it with the request to optimize 804. Additionally, query object 802 receives the optimized supply plan from the optimization algorithm 806 that it sends to the data manager 816. The request from the query object is processed by an optimization algorithm 806. The optimization algorithm generates a set of potential supply plans 806. The optimization algorithm 806 then requests and evaluation of the current potential plan 808. The evaluator then sends a run simulation request with the current supply plan to a modeling object 720. The modeling object 720 receives simulations requests and communicates simulation results 810 to the evaluator 808. The evaluator 808 evaluates the simulation for fitness 812 and then forwards the supply fitness to the optimization algorithm 806. Modeling 810 interfaces with modeling object 720 to write supply plan to modeling database, launch a the simulator, and read or write the simulation results 814.

FIGS. 1-3 a system level overview of the operation of an embodiment was described. FIGS. 4-8 a sequence operation of the exchange between the different components was described. FIGS. 9-12 describe the methods of such embodiment by reference to a series of flowcharts. Describing the methods by reference to a flowchart enables one skilled in the art to develop such programs, firmware, or hardware, including such supply plan optimizing instructions to carry out the methods on suitable computers, executing the instructions from computer-readable media. Similarly, the methods performed by the server computer programs, firmware, or hardware are also composed of computer-executable instructions. Methods 900-1200 are performed by a program executing on or performed by firmware or hardware that is a part of a computer, such as computer 1302 in FIG. 13.

Concerning FIGS. 9-12 that correspond to methods 900-1200. The figures use the Unified Modeling Language (UML), which is the industry-standard language to specify, visualize, construct, and document the object-oriented artifacts of software systems. In the figures, a hollow arrow between classes is used to indicate that a child class below a parent class inherits attributes and methods from the parent class. In addition, a solid-filled diamond is used to indicate that an object of the class that is depicted above an object of another classes is composed of the lower depicted object. Composition defines the attributes of an instance of a class as containing an instance of one or more existing instances of other classes in which the composing object does not inherit from the object(s) it is composed of.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 1302 in FIG. 13, or on at least as many computers as there are components.

Figure 9:
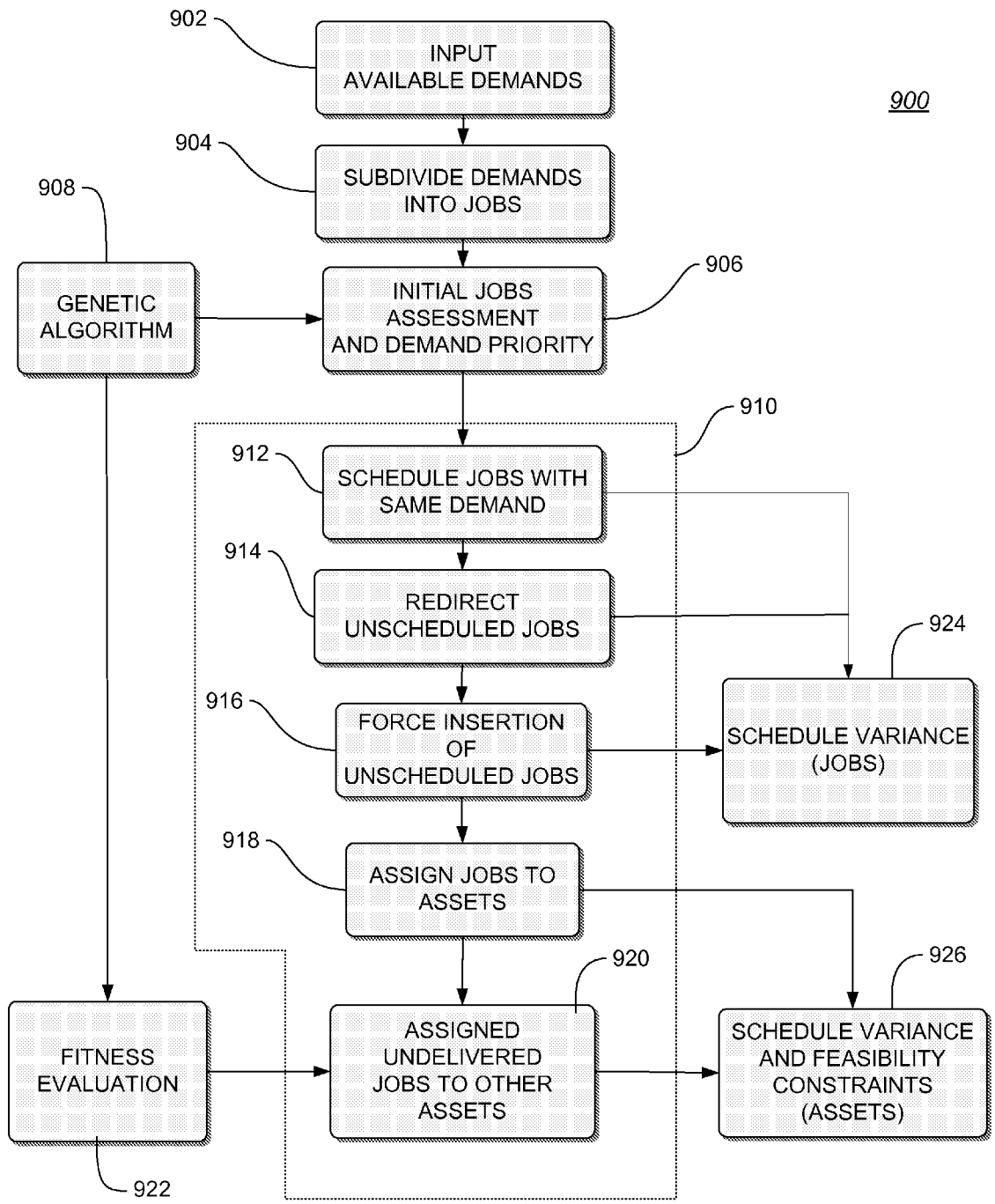
FIG. 9 is flowchart of a method for scheduling optimization in accordance to an embodiment.

FIG. 9 is flowchart of a method for scheduling optimization in accordance to an embodiment. Method 900 solves the need in the art to schedule optimization of a supply plan. Method 900 begins with action 902. Action 902 receives input about available demands with priority level for each of the received demand. A demand can be an operational demand such as a mission demand, supply demand, maintenance demand, event exception demand, or user defined demand. Action 904 subdivides the demands into jobs. In action 906 an initial jobs assessment and demand priority is performed based on the assignment performed by genetic algorithm 908. The genetic algorithm 908 is used to optimize the supply plans based on ever changing set of operational demands from in theater and the priority of those demands to the assigned depots. The genetic algorithm 908 assigns or ranks the demands that maximize operational availability. The assignment from genetic algorithm 908 is then subjected to efficient constructive heuristics 910. The efficient constructive heuristics 910 is an attempt to estimate the transportation cost, the inventory cost, and the timing cost for each demand. Additionally, an attempt is made to investigate inventory decisions that provide savings and future transportations costs. A solution that minimizes logistic footprint while minimizing timing constraints is the desired solution.

The constructive heuristics procedure begins with action 912. In action 912 jobs with the same demands are schedule. The same demands jobs are then forwarded to action 924 for processing. In action 914, a redirection of unscheduled jobs is performed. The unscheduled jobs in action 914 are then forwarded to action 924 for processing. In action 916, there is a force insertion of unscheduled jobs and then forwarded to action 924 for processing. In action 918, an assignment of jobs to assets is performed. In action 920, undelivered jobs are assigned to other assets based on the fitness evaluation of action 922. In action 924, variance in the schedule is assigned to particular jobs. In action 926, a schedule of variance and feasibility constrains is performed on the assets.

Figure 10:
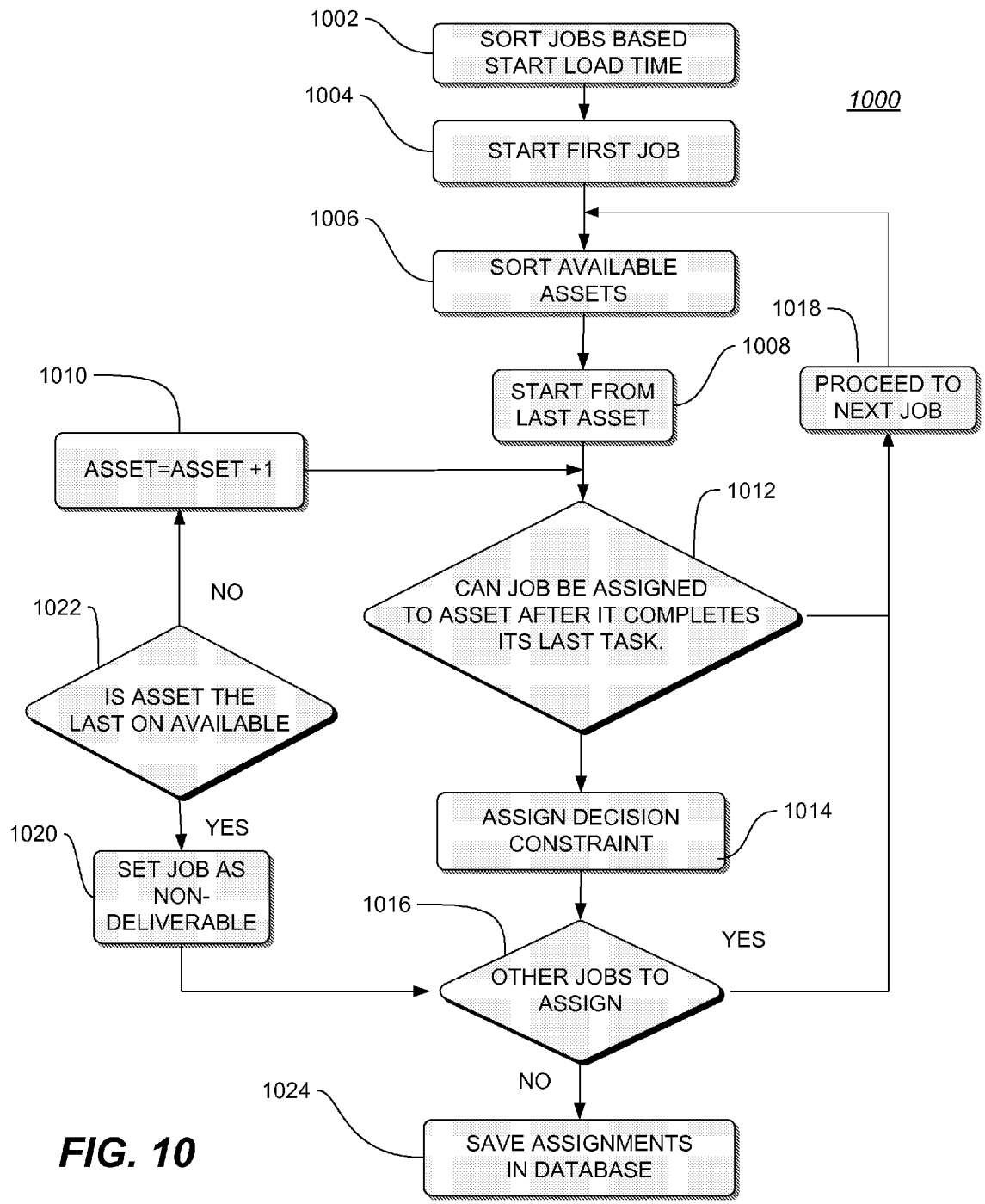
FIG. 10 is a flowchart of a method for scheduling assets in accordance to an embodiment.

FIG. 10 is a flowchart of a method for scheduling assets in accordance to an embodiment. Method 1000 begins with action 1002 jobs are sorted based on start load time. In action 1004 the first job is started. In action 1006, the available assets are sorted. In action 1008, the last asset is selected to start the process. In action 1010 a counter created with the asset as the index. In action 1012, a decision block determines if the job can be assigned to asset after it completes its last task. If the decision is "NO" then a new job is assigned for processing at action 1018. If the answer is "YES" then a decision constraint is assigned. In action 1016, a decision is made as to other jobs to assign. If the decision is "YES" then action 1018 proceeds to the next job. If the answer is "NO" the assignment is assigned to the database in action 1024. In action 1022, a decision is made as to whether the asset is the last on available. If the decision is "YES" the job is deemed as non-deliverable and control passes to action 101 for further processing. If the answer is "NO" action passes to action 1010 where the counter is incremented by one and the cycle is repeated.

Figure 11:
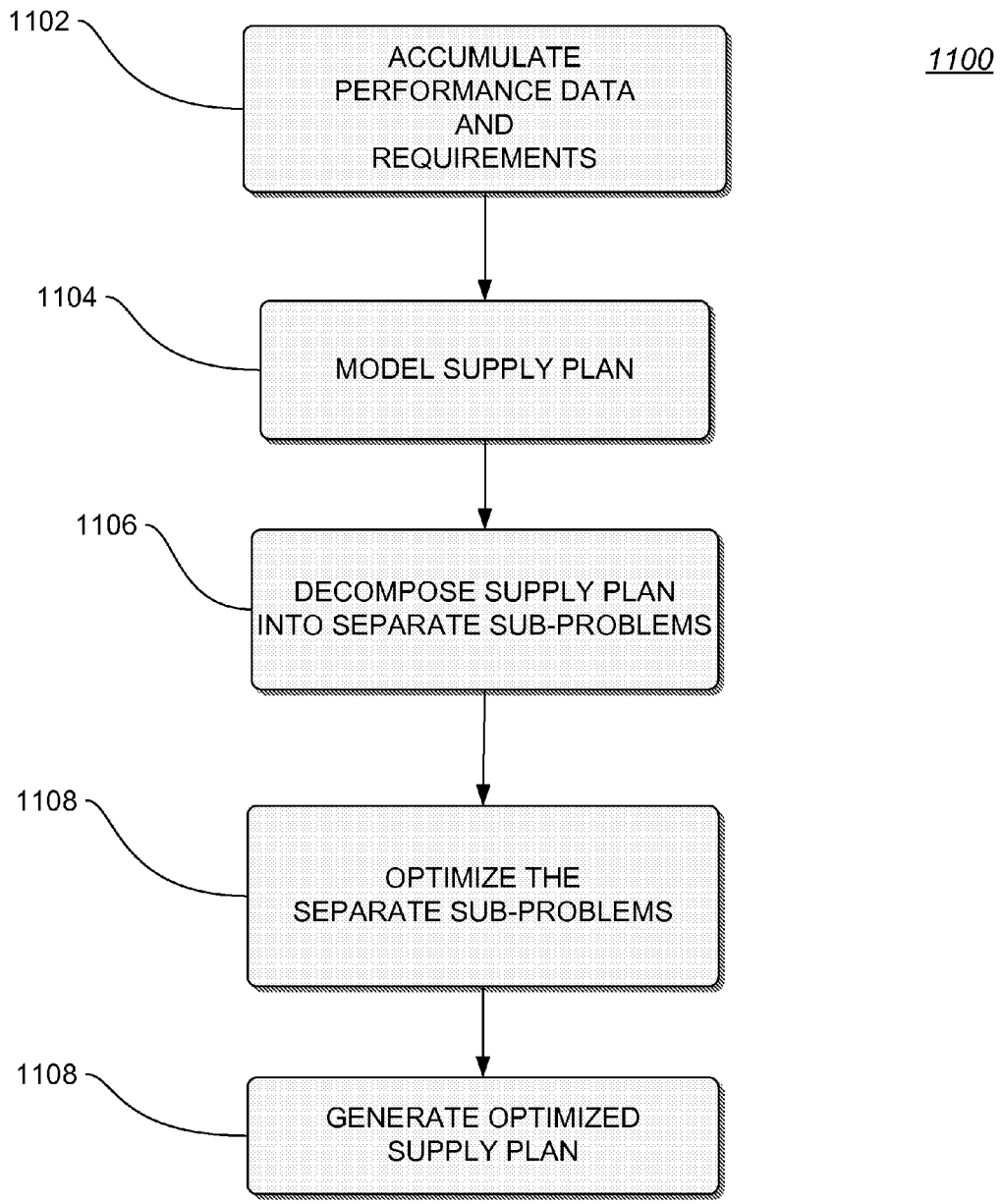
FIG. 11 is a flowchart of a method to optimize a supply plan for managing the flow of one or more items through a supply chain network in accordance to an embodiment.

FIG. 11 is a flowchart of a method to optimize a supply plan for managing the flow of one or more items through a supply chain network in accordance to an embodiment. Method 1100 begins with action 1102. In action 1102, performance data and requirements are accumulated. In action 1104, a model of the supply plan is generated from the accumulated performance data and requirements. In action 1108, the supply plan from action 1104 is decomposed into separate sub-problems. In action 1108, the separate sub-problems are optimized. The two separated sub-problems are solved with different heuristic algorithms. Namely genetic algorithms are used to optimize the supply plans based on ever changing set of operational demands from in theater and the priority of those demands to the assigned depots, while efficient constructive heuristics are used to deal with footprint and timing constraints. In action 1108, an optimized supply plan is generated by converging the optimized separate sub-problems into the supply plan The generated optimized supply plan is forwarded to the user at terminal 205 and to supply plan database 302.

Figure 12:
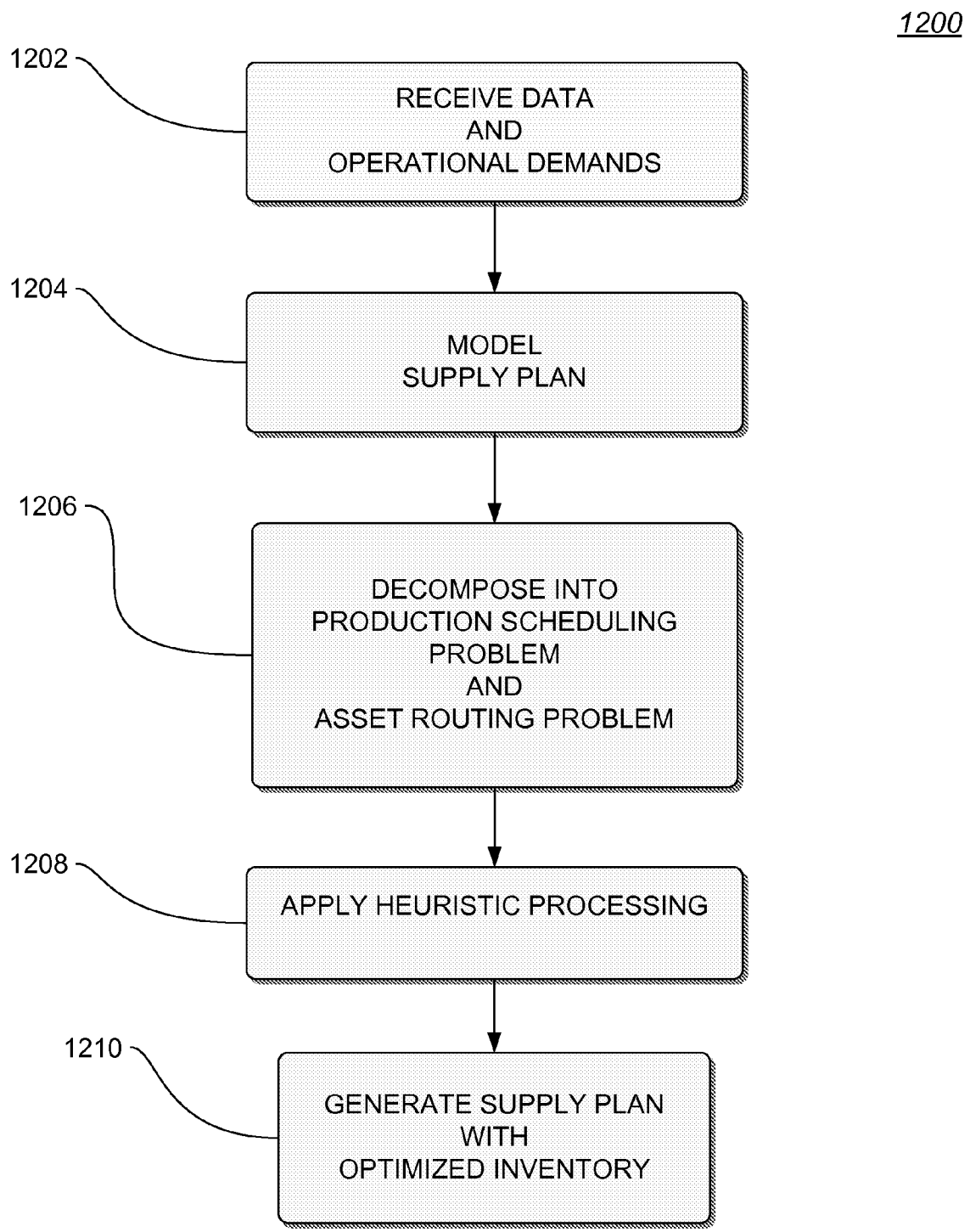
FIG. 12 is a flowchart of a method to optimize inventory and to generate a supply plan for managing the flow of at least one item through a supply chain network having a number of geographically distributed storage and production centers in accordance to an embodiment; and, FIG. 13 is a block diagram of hardware and operating environment in which different embodiments can be practiced.

FIG. 12 is a flowchart of a method to optimize inventory and to generate a supply plan for managing the flow of at least one item through a supply chain network having a number of geographically distributed storage and production centers in accordance to an embodiment. Method 1200 begins with action 1202. In action 1202, data and operational demands are received. In action 1204, a supply plan model is generated from the received data and operational demands. In action 1206, supply plan model is decomposed into a production scheduling problem and an asset routing problem. In action 1208, the decomposed problems are subjected to heuristic processing so as to arrive at an optimized solution. In action 1210, a supply plan with optimized inventory is generated.

The optimized supply plan (generated) is forwarded to user terminal 205 and to supply plan database 302.

In some embodiments, methods 900-1200 are implemented as a computer data carrier that represents a sequence of instructions which, when executed by a processor, such as processor 1304 in FIG. 13, cause the processor to perform the respective method. In other embodiments, methods 900-1200 are implemented as a computer-accessible medium having executable instructions capable of directing a processor, such as processor 1304 in FIG. 13, to perform the respective method. In varying embodiments, the medium is a magnetic medium, an electronic medium, or an optical medium.

FIG. 13 is a block diagram of a hardware and operating environment 1300 in which different embodiments can be practiced. The description of FIG. 13 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 1302 includes a processor 1304, commercially available from Intel, AMD, Cyrix and others. Computer 1302 also includes random-access memory (RAM) 1306, read-only memory (ROM) 1308, and one or more mass storage devices 1310, and a system bus 1312, that operatively couples various system components to the processing unit 1304. The memory 1306, 1308, and mass storage devices, 1310, are types of computer-accessible media. Mass storage devices 1310 are more specifically types of nonvolatile computer-accessible media and can include one or more hard disk drives, floppy disk drives, optical disk drives, and tape cartridge drives. The processor 1304 executes computer programs stored on the computer-accessible media.

Computer 1302 can be communicatively connected to the Internet 1314 via a communication device 1316. Internet 1314 connectivity is well known within the art. In one embodiment, a communication device 1316 is a modem that responds to communication drivers to connect to the Internet via what is known in the art as a "dial-up connection". In another embodiment, a communication device 1316 is an Ethernet® or similar hardware network card connected to a local-area network (LAN) that itself is connected to the Internet via what is known in the art as a "direct connection" (e.g., T1 line, etc.).

A user enters commands and information into the computer 1302 through input devices such as a keyboard 1318 or a pointing device 1320. The keyboard 1318 permits entry of textual information into computer 1302, as known within the art, and embodiments are not limited to any particular type of keyboard. Pointing device 1320 permits the control of the screen pointer provided by a graphical user interface (GUI) of operating systems such as versions of Microsoft Windows®. Embodiments are not limited to any particular pointing device 1320. Such pointing devices include mice, touch pads, trackballs, remote controls and point sticks. Other input devices (not shown) can include a microphone, joystick, game pad, satellite dish, scanner, or the like.

In some embodiments, computer 1302 is operatively coupled to a display device 1322. Display device 1322 is connected to the system bus 1312. Display device 1322 permits the display of information, including computer, video and other information, for viewing by a user of the computer. Embodiments are not limited to any particular display device 1322. Such display devices include cathode ray tube (CRT) displays (monitors), as well as flat panel displays such as liquid crystal displays (LCD's). In addition to a monitor, computers typically include other peripheral input/output devices such as printers (not shown). Speaker 1324 provides audio output signals. Speaker 1324 is also connected to the system bus 1312.

Computer 1302 also includes an operating system (not shown) that is stored on the computer-accessible media RAM 1306, ROM 1308, and mass storage device 1310, and is executed by the processor 1304. Examples of operating systems include Microsoft Windows®, Apple MacOS®, Linux®, UNIX®. Examples are not limited to any particular operating system, however, and the construction and use of such operating systems are well known within the art.

Embodiments of computer 1302 are not limited to any type of computer 1302. In varying embodiments, computer 1302 comprises a PC-compatible computer, a MacOS®-compatible computer, a Linux®-compatible computer, or a UNIX®-compatible computer. The construction and operation of such computers are well known within the art.

Computer 1302 can be operated using at least one operating system to provide a graphical user interface (GUI) including a user-controllable pointer. Computer 1302 can have at least one web browser application program executing within at least one operating system, to permit users of computer 1302 to access an intranet, extranet or Internet world-wide-web pages as addressed by Universal Resource Locator (URL) addresses. Examples of browser application programs include Netscape Navigator® and Microsoft Internet Explorer®.

The computer 1302 can operate in a networked environment using logical connections to one or more remote computers, such as remote computer 1328. These logical connections are achieved by a communication device coupled to, or a part of, the computer 1302. Embodiments are not limited to a particular type of communications device. The remote computer 1328 can be another computer, a server, a router, a network PC, a client, a peer device or other common network node. The logical connections depicted in FIG. 13 include a local-area network (LAN) 1330 and a wide-area network (WAN) 1332. Such networking environments are commonplace in offices, enterprise-wide computer networks, intranets, extranets and the Internet.

When used in a LAN-networking environment, the computer 1302 and remote computer 1328 are connected to the local network 1330 through network interfaces or adapters 1334, which is one type of communications device 1316. Remote computer 1328 also includes a network device 1336. When used in a conventional WAN-networking environment, the computer 1302 and remote computer 1328 communicate with a WAN 1332 through modems (not shown). The modem, which can be internal or external, is connected to the system bus 1312. In a networked environment, program modules depicted relative to the computer 1302, or portions thereof, can be stored in the remote computer 1328.

Computer 1302 also includes power supply 1338. Each power supply can be a battery.

A hybrid meta-heuristic approach based on genetic algorithms to optimize inventory and generate a supply plan is described. A technical effect of the hybrid meta-heuristic approach based on genetic algorithms to optimize inventory and generate a supply plan in order to take into account the intrinsic prohibitive complexity of generating a supply plan for a type of platform being deployed in theater a heuristic algorithm is devised to decompose the supply plan problem in to separate sub-problems, which will be tackled one after the other. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database protocols and communication environments and alternate technologies which provide the same functionality as described herein.

We claim:

1. A computer implemented method for developing an optimized supply plan of scheduled jobs and assets in a mission critical supply chain network of an operations theater site comprising:

inputting, with a processor, operational demands and a priority level for each of the operational demands, the input operational demands being selected from a group consisting of: mission demand, supply demand, maintenance demand, event exception demand and user defined demand of the operations' theater site that includes at least one of: squadrons, bases, repair facilities, supply warehouses, and factories;

dividing, with the processor, the input operational demands into jobs;

performing, with the processor, an initial jobs assessment and demand prioritization based on an assignment performed by a genetic algorithm that optimizes supply plans based on dynamic changes of the input operational demands and the priority level for each of the input operational demands;

scheduling, with the processor, jobs with a same demand prioritization based on the performed initial jobs assessment and demand prioritization;

forwarding, with the processor, the scheduled jobs to a jobs schedule variance processing;

determining, by the processor, and redirecting unscheduled jobs from the scheduled jobs with same demand;

forwarding, with the processor, the determined and redirected unscheduled jobs to the jobs schedule variance processing;

assigning, by the processor, the scheduled jobs with same demand and the determined and redirected unscheduled jobs to the assets;

forwarding, with the processor, the assigned scheduled jobs to an assets schedule variance and feasibility constraints processing, the assigning using a workflow for scheduling the assets comprising a job start load time sorting, an incremental assigning of the assets until a last asset availability, a determination of job assignment achievability after previous task completion by the asset, a decision constraint, and an overall number of other jobs to be assigned;

determining, by the processor, undelivered jobs from the determined and redirected unscheduled jobs to the assets;

assigning, by the processor, the undelivered determined and redirected unscheduled jobs to other assets based on a fitness evaluation;

forwarding, with the processor, the assigned undelivered determined and redirected unscheduled jobs to the assets schedule variance and feasibility constraints processing, wherein the fitness evaluation comprises:

generating chromosomes populations of possible solutions for each of the assigned undelivered determined and redirected unscheduled jobs, selecting fittest chromosomes based on a prevailing ranking of the chromosomes according to an objective selected from a group consisting of: maximizing an operational availability and minimizing a logistic footprint, selecting a predetermined number of the fittest chromosomes, pairing the selected predetermined number of the fittest chromosomes with each other, interchanging genes in the pairs of the selected predetermined number of the fittest chromosomes beyond a crossover point of a first paired fittest chromosome and before the crossover point of a second paired fittest chromosome, mutating the interchanged predetermined number of chromosomes to create new chromosomes, and forwarding the new chromosomes to a simulator for performing feasibility and impact analysis on the mutated interchanges; and repeating, with the processor, the fitness evaluation until the optimized supply plan of the scheduled jobs and assets is developed in the mission critical supply chain network of the operations' theater site.

2. A system for developing an optimized supply plan of scheduled jobs and assets in a mission critical supply chain network of an operations' theater site, the system comprising: one or more processor components programmed to:

input operational demands and a priority level for each of the input operational demands, the input operational demands being selected from a group consisting of: mission demand, supply demand, maintenance demand, event exception demand and user defined demand of the operations' theater site that includes at least one of: squadrons, bases, repair facilities, supply warehouses, and factories;

divide the input operational demands into jobs;

perform an initial jobs assessment and demand prioritization based on an assignment performed by a genetic algorithm that optimizes supply plans based on dynamic changes of the input operational demands and the priority level for each of the input operational demands;

schedule jobs with same demand based on the performed initial jobs assessment and demand prioritization;

forward the scheduled jobs to a jobs schedule variance processing;

determine and redirect unscheduled jobs from the scheduled jobs with same demand;

forwarding the determined and redirected unscheduled jobs to the jobs schedule variance processing;

assign the scheduled jobs with same demand and the determined and redirected unscheduled jobs to the assets;

forward the assigned scheduled jobs to an assets schedule variance and feasibility constraints processing, the assigning using a workflow for scheduling the assets comprising a job start load time sorting, an incremental assigning of the assets until a last asset availability, a determination of job assignment achievability after previous task completion by the asset, a decision constraint, and an overall number of other jobs to be assigned;

determine undelivered jobs from the determined and redirected unscheduled jobs to the assets;

assign the undelivered determined and redirected unscheduled jobs to other assets based on a fitness evaluation;

forward the assigned undelivered determined and redirected unscheduled jobs to the assets schedule variance and feasibility constraints processing, wherein the fitness evaluation comprises:

generating chromosomes populations of possible solutions for each of the assigned undelivered determined and redirected unscheduled jobs, selecting fittest chromosomes based on a prevailing ranking of the chromosomes according to an objective selected from a group consisting of: maximizing an operational availability and minimizing a logistic footprint, selecting a predetermined number of the fittest chromosomes, pairing the selected predetermined number of the fittest chromosomes with each other, interchanging genes in the pairs of the selected predetermined number of the fittest chromosomes beyond a crossover point of a first paired fittest chromosome and before the crossover point of a second paired fittest chromosome, mutating the interchanged predetermined number of chromosomes to create new chromosomes, and forwarding the new chromosomes to a simulator for performing feasibility and impact analysis on the mutated interchanges; and repeat the fitness evaluation until the optimized supply plan of the scheduled jobs and assets is developed in the mission critical supply chain network of the operations' theater site.

3. A non-transitory computer readable storage medium for developing an optimized supply plan of scheduled jobs and assets in a mission critical supply chain network of an operations' theater site, on which is recorded computer executable instructions that, when executed by a processor, cause the processor to execute the steps of a method comprising:

inputting operational demands and a priority level for each of the input operational demands, the input operational demands being selected from a group consisting of: mission demand, supply demand, maintenance demand, event exception demand and user defined demand of the operations' theater site that includes at least one of: squadrons, bases, repair facilities, supply warehouses, and factories;

dividing the input operational demands into jobs;

performing an initial jobs assessment and demand prioritization based on an assignment performed by a genetic algorithm that optimizes supply plans based on dynamic changes of the input operational demands and the priority level for each of the input operational demands;

scheduling jobs with a same demand prioritization based on the performed initial jobs assessment and demand prioritization;

forwarding the scheduled jobs to a jobs schedule variance processing;

determining and redirecting unscheduled jobs from the scheduled jobs with same demand;

forwarding the determined and redirected unscheduled jobs to the jobs schedule variance processing;

assigning the scheduled jobs with same demand and the determined and redirected unscheduled jobs to the assets;

forwarding the assigned scheduled jobs to an assets schedule variance and feasibility constraints processing, the assigning using a workflow for scheduling the assets comprising a job start load time sorting, an incremental assigning of the assets until a last asset availability, a determination of job assignment achievability after previous task completion by the asset, a decision constraint, and an overall number of other jobs to be assigned;

determining undelivered jobs from the determined and redirected unscheduled jobs to the assets;

assigning the undelivered determined and redirected unscheduled jobs to other assets based on a fitness evaluation;

forwarding the assigned undelivered determined and redirected unscheduled jobs to the assets schedule variance and feasibility constraints processing, wherein the fitness evaluation comprises:

generating chromosomes populations of possible solutions for each of the assigned undelivered determined and redirected unscheduled jobs, selecting fittest chromosomes based on a prevailing ranking of the chromosomes according to an objective selected from a group consisting of: maximizing an operational availability and minimizing a logistic footprint, selecting a predetermined number of the fittest chromosomes, pairing the selected predetermined number of the fittest chromosomes with each other, interchanging genes in the pairs of the selected predetermined number of the fittest chromosomes beyond a crossover point of a first paired fittest chromosome and before the crossover point of a second paired fittest chromosome, mutating the interchanged predetermined number of chromosomes to create new chromosomes, and forwarding the new chromosomes to a simulator for performing feasibility and impact analysis on the mutated interchanges; and repeating the fitness evaluation until the optimized supply plan of the scheduled jobs and assets is developed in the mission critical supply chain network of the operations' theater site including at least one of: squadrons, bases, repair facilities, supply warehouses, and factories.

* * * * *